2,884,356

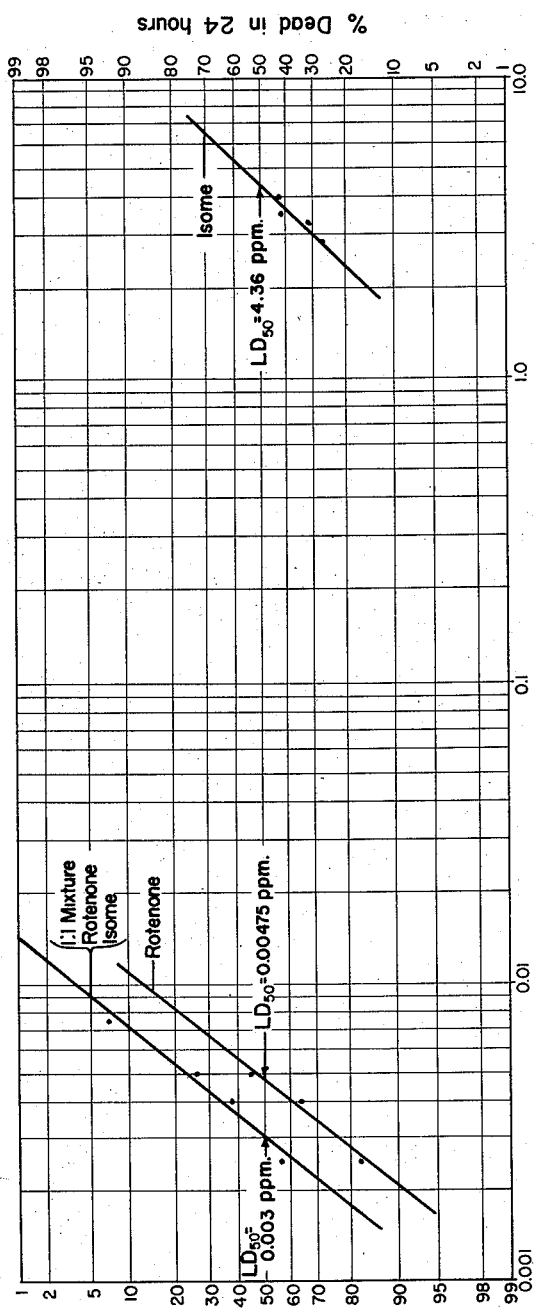

FISH TOXICANT COMPOSITIONS AND METHOD OF USING THEM

Donald F. Starr, Upper Montclair, and Douglas R. Calsetta, Iselin, N.J., assignors to S. B. Penick & Company, New York, N.Y.

Application March 7, 1956, Serial No. 570,023

2 Claims. (Cl. 167—46)

Our invention relates to improved fish toxicant compositions and to a method of using them. More particularly, the invention is concerned with fish toxicant compositions which comprise rotenone and di-n-propyl, 6,7-methylene dioxy-3-methyl-1,2,3,4-tetrahydronaphthalene, 1,2-dicarboxylate, known in the trade as "isome," and with the process of treating bodies of water containing fish with such compositions. The compositions may be employed in powder form, or they may be applied in emulsifiable form such as liquid or paste. The liquid and paste contain the toxicants, solvents, water, emulsifier and other ingredients in suitable proportions, as hereinafter described.

Fish toxicants are useful in reclaiming, for fishing, bodies of water such as ponds, lakes and streams. Many of our best lakes have failed to provide good fishing after the public has had access to them for a prolonged time, say five to ten years. Frequently this is due to the presence of rough fish such as carp who compete with desirable fish for available food supply and outgrow them. Under such conditions it is desirable to restore the bodies of water to good fishing by eliminating all the fish, closing them to reintroduction of rough species, and then restocking them with the desired species of game fish. The water is allowed to remain free of fish for a suitable period of time, say one month or longer; during that time the water detoxifies and fish food organisms begin to flourish. With excellent food and no competing species, small game fish introduced into the water grow rapidly, and about a year later excellent fishing may be expected.

In making up our compositions, rotenone, preferably in the form of rotenone-containing plant material described for example in the Encyclopedia of Chemical Technology, 1951, volume 7, page 889, such as cubé, derris, timbo and the like or extracts thereof such as soft or brittle cubé extract and the like, is admixed with isome to produce the various formulations hereinafter described.

The simplest and most economical of our improved compositions can be prepared for example by impregnating a plant material such as powdered cubé root, with the isome dissolved in an oxygenated or halogenated hydrocarbon solvent such as acetone, ethylene dichloride, carbon tetrachloride, or mixtures thereof. The solvent facilitates the mixing of the ingredients and upon evaporation it leaves behind the finished powder.

The compositions may be used in this fundamental powder form, or the powder may be modified to make it more convenient to apply by the addition of a wetting agent or emulsifier which may be of the non-ionic type such as "Triton X-100," "Atlox 1045A," and the like; or of the nonionic-anionic type such as "Remsen 202," "Atlox 3335," "Tritox X-160," "Mal 20A," and the like.

The compositions may be still further modified to produce emulsifiable liquid combinations of rotenone with the isome. Extracts of rotenone-bearing plants such as brittle or soft extract of cubé may be dissolved in solvents or combinations of solvents. Particularly suitable solvents are methylated naphthalenes such as the Velsicols "AR 50," "AR 50G," "AR 55," "AR 60," and the like. If desired, a co-solvent such as one of the oxygenated or chlorinated hydrocarbons or mixtures thereof, referred to above, may also be employed to facilitate dissolution of the material. An emulsifier of the types mentioned above is added to the solution to yield the emulsifiable combinations with isome. The density of these emulsifiable mixtures should be about 0.96 to 1.05 so that the emulsified phase disperses well in any large body of water and then settles to the bottom. In the treatment of lakes, combinations of the above-mentioned solvents can be used to produce mixtures having the preferred densities.

The rotenone content of my new compositions can be determined by the official method of assay for rotenone described on page 67 of the "Standard Methods of Analysis," 8th edition, 1955, published by the Association of Official Agricultural Chemists. We have found that formulations containing rotenone and isome in equal amounts by weight, such as 5:5, of the compositions, are particularly effective fish toxicants, and that formulations containing the two ingredients within the limits of 2:1, 1:2, 1:1, and 1:4 are also effective. The formulations are made up from the aforementioned ingredients within these limits so as to produce the desired killing effect and to give a product which when added to a body of fresh water will form a voluminous emulsion which disperses and sinks rapidly in the water.

Our test animal for laboratory experiments was the common goldfish (*Carassius auratus*) known as "small goldfish" in the trade.

For the laboratory tests the fish were kept in aerated tap water which was held at temperatures of between about 16–23° C. with a range of no more than 4° C. for the complete series of tests.

Test solutions of rotenone with and without the isome were made up with methylated naphthalene solvents and, if necessary, with a co-solvent such as acetone. A standard concentrate containing 10% rotenone was formulated to eliminate possible variations in rotenone content which might occur in rotenone-containing plant materials. For example, 10 g. of soft cubé extract containing 28% rotenone were dissolved in 5.6 g. of acetone, and 12.4 g. of "Velsicol AR 50" were added to the solution. Other concentrations can be prepared accordingly.

From this concentrate a standard test solution was prepared which contained 5% rotenone dissolved in acetone, a methylated naphthalene solvent, and an emulsifier. All other test solutions containing rotenone and isome were formulated in the same manner, except that the weight of the isome added was subtracted from the weight of the methylated naphthalene solvent added so that the formula contained a correspondingly smaller amount of the solvent. Test solutions containing no rotenone but 20% of the isome were similarly made up.

This standard test solution was diluted for the tests as follows:

One ml. of it was diluted to 100 ml. with water and shaken. One and one-half ml. of the resulting emulsion was diluted to 100 ml. with water, and shaken. Ten ml. of this emulsion added to 4 gals. of water in the tank gave a concentration of 0.005 p.p.m. of rotenone. Other final concentrations can be readily calculated.

The test solutions containing rotenone and isome were similarly diluted. In the case of the test material without the rotenone, one and eight tenths ml. of a 20% solution was diluted with 1,200 ml. of water and shaken. Two hundred ml. of this emulsion in 4 gals. of water gave 4.0 p.p.m. of the isome in the tank. Other concentrations were worked out accordingly.

The kill was observed at 24 hours. When the final counts were completed, all fish used in these tests were discarded. Fish that had not been previously treated were used in all tests.

The following example illustrates our invention. After the series of tests on any one test material were completed the results were compiled on the basis of the percent fish killed in 24 hours. These results were plotted on log probability paper as dosage mortality curves. The dosage was expressed as p.p.m. of the toxicants. The dose necessary to produce an $LD_{50}$ was then read from the curve.

Fig. 1 shows the dosage mortality curves for isome, rotenone, and a 1:1 ratio of rotenone and isome.

EXAMPLE 1.—ROTENONE AND ISOME, ALONE AND IN MIXTURES, APPLIED AGAINST THE COMMON GOLDFISH

Table 1 gives the ingredients (percent, w./w.) of the concentrates employed in these experiments. The concentrates, except for the RI-0-20, were diluted from the 10% standard solution already described. RI stands for rotenone-isome and the numerals connected with that symbol indicate the proportions in which these two ingredients were mixed.

Table 1

| Ingredient | RI 5-0 | RI 5-5 | RI 0-20 |
|---|---|---|---|
| Rotenone | 5.0 | 5.0 | |
| Isome | | 5.0 | 20.0 |
| Acetone | 20.0 | 20.0 | 10.0 |
| "Velsicol AR 50" | 65.0 | 60.0 | 60.0 |
| "Atlox C7626CJ" | 10.0 | 10.0 | 10.0 |
| | 100.0 | 100.0 | 100.0 |

These concentrates were tested against goldfish. The results are recorded in Table 2, in average percent mortality of the fish.

Table 2

| Formulation | Conc. of Formulation, p.p.m. | No. of Fish | Percent Dead, 24 hrs. | $LD_{50}$ (p.p.m.) Rotenone+Isome |
|---|---|---|---|---|
| RI 5-0 | 0.10 | 60 | 55 | 0.00475+0. |
| | 0.08 | 60 | 37 | |
| | 0.05 | 60 | 17 | |
| RI 5-5 | 0.15 | 60 | 93 | 0.00300+0.00300. |
| | 0.10 | 60 | 75 | |
| | 0.08 | 60 | 63 | |
| | 0.05 | 70 | 44 | |
| RI 0-20 | 20.0 | 70 | 44 | 0+4.36. |
| | 18.0 | 70 | 43 | |
| | 16.0 | 70 | 31 | |
| | 14.0 | 60 | 27 | |

From the $LD_{50}$ values in Table 2 it can readily be observed that the 1:1 ratio of rotenone and isome, RI 5-5, is approximately one and one-half times as effective as the rotenone formulation RI 5-0 alone. Substantially higher dosages of isome alone RI 0-20 than are present in the mixture RI 5-5 are necessary to give an $LD_{50}$.

Instead of an aqueous solution our formulations can be employed in the form of pastes comprising powdered cubé root, isome, a solvent for these two compounds, water, an emulsifier, and a wetting agent. An illustrative formulation is as follows:

Ingredients— Percent, w./w.
"Velsicol AR 50" _____ 12.1
Isome _____ 3.0
Polyethylene Glycol 600 Monoleate _____ 12.1
Butyl Carbitol _____ 12.1
Vatsol OT 70% _____ 3.47
Water _____ 15.8
Hydroquinone _____ .23
Cubé powder at 7.5% rotenone _____ 41.2

The materials are combined in the order listed, care being taken that the liquids are thoroughly mixed together and the hydroquinone is completely dissolved before the cubé powder is added. The cubé powder is then mixed in thoroughly until a thick paste is obtained. The "Velsicol AR 50" is a methylated naphthalene solvent for rotenone and isome; it can be replaced by any of the aforementioned "Velsicols," or the trademarked "Sovacide 544-C," and the like. The trademarked "Polyethylene Glycol 600 Monoleate" is an emulsifier and can be replaced by any of the aforementioned emulsifiers of the non-ionic or nonionic-anionic type. The trademarked "Vatsol OT 70%" acts as a wetting agent for the cubé powder, and any other similar agent can be employed. The butyl Caribtol is a mutual solvent for the "Velsicol AR 50" and water, and other water-miscible solvents such as the trademarked "Butyl Cellosolve" or acetone can be used. The water is added to give the paste proper consistency. Hydroquinone is added to stabilize the rotenone, and any other stabilizer having the same effect may be used. The formulation should always contain 41.25 cubé powder. A more concentrated rotenone paste may be prepared by using a higher test cubé powder. For example, an 8.7% rotenone powder would give a 3.5% rotenone paste. A 10% rotenone powder would give a 4% rotenone paste. If a more concentrated rotenone paste is prepared, the concentration of isome is adjusted to maintain a 1:1 ratio with rotenone. In general, the rotenone to isome ratio in the paste can be adjusted 1:2, 1:4 or 2:1.

Table 3 shows the relative effectiveness of the 1:1 ratio of rotenone and isome as compared to formulations containing each component alone. The last two columns of the table were calculated by dividing the necessary p.p.m. of the 1:1 mixture to produce an $LD_{50}$ into that necessary for the rotenone formulation alone, RI 5-0, and for the isome formulation alone RI 0-20.

Table 3

| Formulation | $LD_{50}$—p.p.m. | Times Better than RI 5-0 | Times Better than RI 0-20 |
|---|---|---|---|
| RI 5-0 | 0.095 | | |
| RI 5-5 | 0.060 | 1.58 | 363.0 |
| RI 0-20 | 21.800 | | |

Various modifications may be made in the compositions of the present invention or in the manner of treating bodies of water therewith without departing from the spirit or scope of the invention and it is to be understood that we limit ourselves only as defined in the appended claims.

We claim:

1. The process of treating bodies of water containing fish for killing said fish which comprises dispersing therein a composition comprising rotenone, di-n-propyl, 6,7-methylenedioxy-3-methyl-1,2,3,4-tetrahydronaphthalene, 1,2-dicarboxylate, solvents for these two components, an emulsifier and a wetting agent.

2. A fish toxicant composition which on application to the surface of a body of water forms a voluminous emulsion which sinks rapidly, having as toxicant ingredients a rotenone-containing plant material and di-propyl, 6,7 - methylenedioxy - 3 - methyl - 1,2,3,4 - tetrahydronaphthalene, 1,2-dicarboxylate; a solvent for said toxicants and an emulsifying agent; said toxicants being present in the ratios between 2:1 to 1:4 respectively, and the specific gravity of the mixture being in the range from 0.96 to 1.05.

References Cited in the file of this patent

Smith et al.: Canadian Fish Culturist, No. 8 (1950), pp. 17–19.

Stroud: Progressive Fish Culturist, vol. 13, No. 3 (1951), pp. 143–145.

Reid et al.: U.S.D.A. Bur. of Entomology and Plant Quarantine "E-834" (March 1952).